United States Patent
Ahne et al.

(10) Patent No.: US 7,385,715 B2
(45) Date of Patent: Jun. 10, 2008

(54) QUICK EDIT AND SPEED PRINT CAPABILITY FOR A STAND-ALONE INK JET PRINTER

(75) Inventors: Adam Jude Ahne, Lexington, KY (US); David Allen Crutchfield, Lexington, KY (US); Mark Joseph Edwards, Lexington, KY (US); Galen Arthur Rasche, Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 248 days.

(21) Appl. No.: 11/278,607

(22) Filed: Apr. 4, 2006

(65) Prior Publication Data

US 2006/0164667 A1    Jul. 27, 2006

Related U.S. Application Data

(60) Division of application No. 09/858,694, filed on May 16, 2001, now Pat. No. 7,068,387, which is a continuation-in-part of application No. 09/610,129, filed on Jul. 5, 2000, now Pat. No. 7,262,873.

(51) Int. Cl.
  *G06F 15/00* (2006.01)
  *G06F 3/12* (2006.01)
  *G06K 1/00* (2006.01)
(52) U.S. Cl. ..................... 358/1.13; 358/1.15
(58) Field of Classification Search ........... 358/1.1, 358/1.15, 1.13, 1.14, 296, 403, 404; 709/201, 709/217, 224; 710/46, 19, 31
See application file for complete search history.

(56) References Cited

U.S. PATENT DOCUMENTS

| | | | |
|---|---|---|---|
| 4,282,583 A | 8/1981 | Khan et al. |
| 4,591,997 A | 5/1986 | Grabel |
| 4,630,198 A | 12/1986 | I-Yuan |
| 4,651,288 A | 3/1987 | Zeising |
| 4,655,577 A | 4/1987 | Ikuta |
| 4,734,789 A | 3/1988 | Smith et al. |
| 4,806,978 A | 2/1989 | Nakatani et al. |
| 4,825,405 A | 4/1989 | Makino et al. |
| 4,926,347 A | 5/1990 | Uchida et al. |
| 4,947,370 A | 8/1990 | Sugitani |
| 5,068,824 A | 11/1991 | Kreutzburg et al. |
| 5,134,437 A | 7/1992 | Maruta et al. |
| 5,448,685 A | 9/1995 | Ogura et al. |
| 5,452,094 A | 9/1995 | Ebner et al. |
| 5,478,155 A | 12/1995 | Sasaki |
| 5,483,623 A | 1/1996 | Nagashima |
| 5,495,559 A | 2/1996 | Makino |
| 5,500,717 A | 3/1996 | Altrieth, III |
| 5,502,797 A | 3/1996 | Bush et al. |
| 5,504,669 A | 4/1996 | Wakabayashi et al. |
| 5,561,528 A | 10/1996 | Johnson et al. |

(Continued)

*Primary Examiner*—Douglas Q. Tran

(57) ABSTRACT

Printer (1) is provided with a mode to edit and print forms without reference to or interruption of a host computer and with immediate printing of one or more of the forms. Page data for the forms is preferably stored in flash memory (21) in a high level printer language. Preferably, at initiation of the forms mode at least the first listed document is immediately prepared by the control data processor (17) of the printer in bit mapped form for printing. Documents can be listed on the control panel by name for ready selection for printing.

5 Claims, 3 Drawing Sheets

U.S. PATENT DOCUMENTS

| | | |
|---|---|---|
| 5,567,061 A | 10/1996 | Nagata |
| 5,592,595 A | 1/1997 | Wakabayashi et al. |
| 5,598,533 A | 1/1997 | Yokota et al. |
| 5,791,790 A | 8/1998 | Bender et al. |
| 5,864,652 A | 1/1999 | Murahashi |
| 6,184,996 B1 | 2/2001 | Gase |
| 6,188,490 B1 | 2/2001 | Miyaki |
| 6,426,801 B1 | 7/2002 | Reed |
| 6,567,180 B1 | 5/2003 | Kageyama et al. |
| 7,130,069 B1 * | 10/2006 | Honma ...................... 358/1.15 |

* cited by examiner

QUICK EDIT AND SPEED PRINT CAPABILITY FOR A STAND-ALONE INK JET PRINTER

CROSS-REFERENCE TO RELATED APPLICATIONS

This is a division of U.S. patent application Ser. No. 09/858,694, filed May 16, 2001 now U.S. Pat. No. 7,068,387, which is a continuation-in-part of U.S. patent application Ser. No. 09/610,129, filed 5 Jul. 2000 now U.S. Pat. No. 7,262,873, both of which are incorporated herein by reference.

BACKGROUND OF THE INVENTION

1. Field of the Invention

The present invention relates to printers. More particularly, the present invention relates to printers having document editing capabilities.

2. General Background of the Invention

Lexmark currently makes a photoprinter, called the Photo Jetprinter 5770, which allows stand-alone or computer attached printing. In the stand-alone mode, the 5770 photoprinter accepts CompactFlash and Smartmedia style memory cards and also supports attachment to an external ZIP drive. CompactFlash and Smartmedia are two popular styles of memory cards used to store digital images produced by digital cameras. The 5770 photoprinter can access and print pictures from all three of the aforementioned media without requiring attachment to a computer. This stand-alone printing capability distinguishes the photoprinters from other types of personal printers.

There currently exist simple text-editing applications, which are capable of opening a text file, editing the text in the file, and saving the changed file. Examples of this are Microsoft's Notepad and WordPad.

There currently exist simple operating systems and file management systems, such as those used in Palm Pilot style devices, that are capable of opening and editing text files without requiring a PC or large amounts of memory.

It is currently possible to interrupt Windows 95 with the parallel port, making it possible to 'wake up' the control program of a printer and start other applications.

There currently exists the concept of Speed Dialing, in which a phone number is stored in memory on a telephone. The number can then be recalled by simply pressing one button, rather than having to dial the entire number.

There currently exist demonstration printers that are able to print out a picture when a potential customer pushes a button.

There currently exist laser printers that allow users to store documents in the printer's memory (see U.S. Pat. No. 5,561,528, assigned to the assignee of the present invention). However, a PC is necessary in order to edit the documents.

Many businesses purchase personal printers to generate custom forms which are used in their daily operations. Examples of such forms might include a bank's application for an automobile loan, a department store's application for a store credit card, or a government office or agency's description of the types and prices of services offered by the office or agency. Prior to the invention of U.S. Pat. No. 5,561,528, businesses using printers to generate these custom forms are required to connect a host computer such as a personal computer to the printer each time the form is generated.

The involvement of the host computer in the process of generating the form can vary from setup to setup. In the simplest of setups, the form data is stored in the printer and the host is required to issue the appropriate commands to select a particular form and instruct the printer to print the form. Other setups require that the form data be stored on the host. In this type of setup, the host must select a form, and send the form data to the printer; the printer does not distinguish this type of print job from other print jobs sent by the host.

In an existing, prior art printer sold by the assignee of this application as the 4037 Page Printer, the printer has what is termed the "Retail" mode. In this mode the printer is placed in a state at which the printing of a single, predetermined document is the only printing function which is performed. The document constitutes a descriptive brochure. Thus prospective customers in a retail sales environment can activate the printing of only that form by an entry at the control panel of the printer stating "Press any key for one page demo". Printing of the brochure takes a long time, since the brochure page is complex and each printing of the brochure requires the final bit map to be prepared prior to printing. When in the Retail mode, the printer enters the Retail mode each subsequent time it is turned on. The Retail mode is activated by the special entry of pressing and holding a predetermined key during turn-on. The same special entry of pressing and holding the predetermined key during turn-on returns the printer to normal printing mode. When in the Retail mode the operator cannot access normal printer functions, such as select menu items on the panel or send print data from a host computer.

In an existing, prior art printer sold since early 1994 by the assignee of this application as the 4039 plus laser printer, individual forms can be printed, each after multiple entries to the control panel. At least four buttons entries on the control panel are pressed to display on the control panel a list of forms (specifically, these entries are "Menu", "Tests", "More" and "Print Demo"). Then a print key is depressed to print the selected form. The selected form is only then formatted to a bit map. After it is printed, the control panel is returned to the normal printing state and printing of the same or another form requires the multiple key entries and the formatting of the document printed.

The invention of U.S. Pat. No. 5,561,528 is operative in a system in which a page description is received in a high level printer language. Such printer language are discussed in some detail in U.S. Pat. No. 5,222,200 to Callister et al, entitled Automatic Printer Data Stream Language Determination, and assigned to the assignee of this invention.

The invention of U.S. Pat. No. 5,561,528 employs the storing of forms in flash memory. Such an operation is a subject of U.S. Pat. No. 5,239,621 to Brown III et al, entitled Printer With Flash Memory, and assigned to the assignee of this invention.

The U.S. Patents discussed below are incorporated herein by reference.

U.S. Pat. No. 4,630,198 "edits" documents by changing how many lines are on each printed page. It also "edits" the documents by using a "space compression mode" which reduces all chains of spaces to a single space.

U.S. Pat. No. 4,651,288 is a processor-controlled dot-matrix typewriter which fills out forms and adjusts text size to fit into blanks on the form after the text is input.

U.S. Pat. No. 4,806,978 discloses a photocopier which includes an image editing system for cropping part of the page being copied. The cropped image is stored in an auxiliary memory device.

U.S. Pat. No. 4,825,405 discloses a stand-alone printer which can store documents received from an external device and reprint them repeatedly. It does not allow editing of the documents.

U.S. Pat. No. 4,926,347 "edits" documents by printing out different indicia depending upon what IC card is plugged into the printer.

U.S. Pat. No. 4,947,370 discloses a word processor which displays the title of a document and part of the document to help the user choose a document. It apparently does not disclose a printer.

U.S. Pat. No. 5,448,685 is a label printer and apparently has no external computer for transmitting files/forms to be edited before printing.

U.S. Pat. No. 5,452,094 "edits" documents by adding logos or letterhead to them after they are scanned into a digital copier—it apparently does not manipulate text.

U.S. Pat. No. 5,483,623 discloses a printer which stores in dot data pages which can be repeatedly printed or overlaid over other new dot data supplied by an external device.

U.S. Pat. No. 5,495,559 discloses a printer having a non-volatile memory for storing initialization data for the printer.

U.S. Pat. No. 5,500,717 can "selective edit"—see that patent's FIG. 7, top right—documents to be photocopied; this patent is really concerned with storing parameters for photocopy jobs so that they can be used over and over—it appears that the document being copied is never stored in non-volatile memory.

U.S. Pat. No. 5,502,797 discloses a printer having a flash memory for storing printer offset adjustments.

U.S. Pat. No. 5,504,669 discloses an accessory control device, such as a cartridge, that contains a processor that processes data into images while the processor for the printer is busy with other processing.

U.S. Pat. No. 5,561,528 discloses a printer having a non-volatile memory for storing forms to be printed on demand independently of a personal computer to which the printer is connected.

U.S. Pat. No. 5,567,061 discloses a detachable character storing cartridge for a printer, wherein the cartridge converts non-dot type character patterns into dot type character patterns.

U.S. Pat. No. 5,592,595 discloses a cartridge for attachment to a printer for performing some page processing tasks to speed up the printer.

U.S. Pat. No. 5,598,533 discloses an integral fax machine and IBM-compatible personal computer which can operate as a scanner and a printer.

U.S. Pat. No. 5,864,652 discloses a printer which simultaneously transmits data to a print engine and a mass memory to allow multiple copies of the data to be printed and to allow printing to be rapidly repeated if an error in printing occurs (such as a paper jam).

U.S. Pat. Nos. 4,591,997; 5,068,824; 5,297,876; 5,478,155; 5,791,790; disclose printers having auxiliary memories for storing printer data to speed up printers.

BRIEF SUMMARY OF THE INVENTION

A stand-alone printer includes the ability to store, edit and print text files without the use of a PC or any type of removable storage media. It differs from the current version of a stand-alone printer in that documents are stored directly in the printer's memory and can be stored in either the document's original format or a printable format and can be edited using controls on the printer.

The printer in accordance with this invention has non-volatile memory, preferably flash memory, for storing documents to be printed in their high level language, which may be a page description language such as PostScript (trademark of Adobe Systems Incorporated) or an ASCII based-language such as PCL (trademark of Hewlett-Packard Co.), or a graphics language. The printer is controlled by standard electronic data processing including a microprocessor and optionally combinational logic, typically in an application specific integrated circuit, termed an ASIC. The electronic control has three modes, a normal mode in which printing is achieved by receiving data and printing it in normal or conventional fashion. The electronic control has a forms mode, selected under operator control or from incoming control signals, which facilitates printing of the stored documents. Such documents are stored in the non-volatile memory with data associated with them designating them as forms. As a part of the second mode, the forms are preferably prepared upon initiation of the forms mode in bit map configuration by the electronic control in the normal operation for the printer. As many forms as permitted by available memory are so prepared. In such bit map form they are ready for immediate printing. Preferably, they are also stored in high speed memory of the control system, commonly known as cache memory, which typically is standard DRAM (dynamic random access memory). Each form is preferably associated with a unique name as part of the entering of data describing the form into the non-volatile memory. In the second mode the control system preferably displays the unique names of forms on an operator panel so that the forms can be selected. Upon selection of a form and its printing, preferably the control system again displays and is prepared to immediately print at least one form on the displayed list. Preferably the second mode has a submode in which normal printing may be readily accessed from the control panel and a submode in which normal printing is prevented, as it is with the previous Retail mode. In the third mode, the present invention takes the stand-alone printing capability of U.S. Pat. No. 5,561,528 a step further by allowing editing, via the printer, of documents stored in the section of nonvolatile memory of the photoprinter.

The present invention bypasses the normal work involved in editing and printing a text-style document (starting the computer, loading Windows, starting the correct application, opening the correct file, etc.) by allowing the printer to edit and print a frequently used file without the direct use of a PC or removable storage media. This is done by giving the printer the ability to store a frequently used file in the printer's nonvolatile memory and edit the file based on user input, preferably via the Liquid Crystal Display (LCD) and control console.

This section of memory is preferably completely separate from the memory used during regular printing operation and is preferably not altered or changed in any way during the actual process of printing. Thus it is now possible to edit and print documents not only without a PC, but also without the use of a removable storage media device such as Compact-Flash or SmartMedia.

The present invention differs from demonstration printers that are able to print out a picture when a potential customer pushes a button in that it has an input console that allows the user to edit the document after it has been stored in the printer's memory.

The present invention differs from existing laser printers that allow users to store documents in the printer's memory in that a PC is not necessary to access, edit and print the stored documents.

The present invention uses stand-alone printer technologies and adds the ability to edit text documents (stored in the printer's nonvolatile memory) preferably via the LCD and user input console of the printer. It is thus able to build off of the concepts of Speed Dialing and Stand-Alone Printing to create a more self-sufficient stand-alone printer that is able to quickly access, edit and print a document by simply pressing a few buttons, rather than having to load and print it from a PC or removable storage media. The basis for the present invention is to give the stand-alone photoprinter some type of nonvolatile memory with in-printer editing capability, making it possible to store frequently used files directly on the printer and edit those files using just the printer. The printer has the ability to edit a file that is stored in the printer's memory based on user input preferably via the LCD and control console, and print the file if so desired. The editing and printing functions can be performed without using a separate computing device.

Two possible ways that files can be stored in the printer's nonvolatile memory are: the files are sent to the printer directly from the computer; or the files are read from a removable storage media device. When a file is copied to the printer's memory directly from the computer, the user has the choice of either keeping the file in its original format or in a 'print format'. By keeping the file in its original format, it is still readable if it is copied from the printer's memory back to the computer, or to a removable storage media device. However, the printer must convert the original format into a printable format before being able to print the document. When the file is stored in 'print format', the printer is able to print the file with less processing time being required. In the preferred implementation of the present invention, this 'print format' is a bitmap file.

The LCD provided by the stand-alone printer, for example, gives the user the ability to interact and give commands to the printer. A menu option is added to the currently available interface software to allow the user to select currently saved files in the printer's memory. The files can be accessed using a file management system such as the one used on a Palm Pilot. By selecting a file, the user is given the option of editing the fields of the document selected. Once the user has edited the document, he can either print the edited document or store the document back into memory. The documents mentioned above can be of various types. Some examples are address labels, business cards income tax forms, or commonly printed images.

For documents that are too large to be stored on the printer's memory, the user has the option of storing only the document's PC memory location on the printer. Thus, when the user chooses to 'speed print' a file for which this option has been chosen, the printer 'wakes up' the printer's control program on the PC. The control program then finds and prints the correct file based on the memory location that the printer gives it. When this option is chosen, the printer is no longer a 'stand-alone' device as defined in the invention background section of this disclosure. However, because the printer performs all of the software interaction, the user is still saved the time required to find and start the correct application, open the correct document, and choose to print. It should also be noted that the user would not be able to edit documents for which this option has been chosen.

The present invention extends the functions of a stand-alone printer to include the ability to store, edit and print text files without the use of a PC or any type of removable storage media. It differs from the current version of a stand-alone printer in that documents are stored directly in the printer's memory and can be stored in either the document's original format or a printable format and edited without using a PC.

BRIEF DESCRIPTION OF THE SEVERAL VIEWS OF THE DRAWINGS

For a further understanding of the nature, objects, and advantages of the present invention, reference should be made to the following detailed description, read in conjunction with the following drawings, wherein like reference numerals denote like elements and wherein.

DETAILED DESCRIPTION OF THE INVENTION

Figure 1:
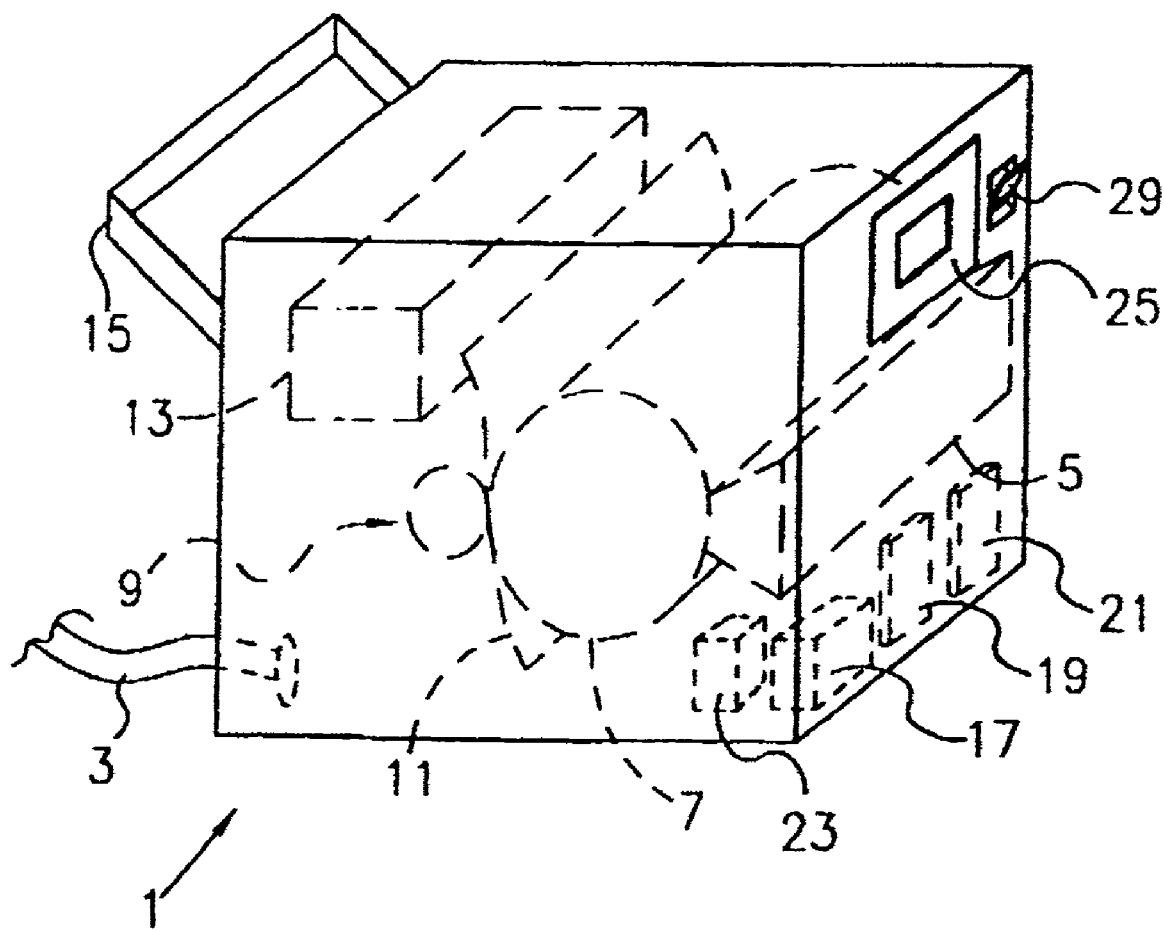
FIG. 1 is illustrative of a printer in accordance with this invention.

FIG. 1 illustrates a printer 1 in accordance with this invention having the ability to edit and print forms on demand without significant delay at operator input without requiring involvement of a host computer. Of course, few businesses currently operate in an environment where a printer is not connected to some host computer. If anything, the opposite is true—multiple host computers are connected to one printer. However, when a printer 1 is in its mode for forms on demand, the operator's host computer may operate independently of printer 1, for example the host may process data associated with an application which is different from the application associated with the custom forms of the operators' business. The operator edits and prints forms on printer 1 without interrupting the host computer. Since printer 1 has the capability of editing and printing the form independent of the host computer, the operator can save a significant amount of time since the need to exit or interrupt one application and start another is not required. This capability may be ideal, for example, for a loan officer who has daily office responsibilities as well as responsibilities for interviewing perspective loan applicants. When a loan applicant walks up to the officer's desk, the officer is no longer required to interrupt an application program currently in use to edit and print a loan application.

Page description information is received by printer 1 in a standard manner from a communications cable 3. Printer 1 may be any suitable printer with respect to normal imaging by composing bit images from received data describing images in a language. For illustrative purposes printer 1 is shown suggestive of an electrophotographic printer having an optical system 5 operative on drum 7. Drum 7 transfers images defined by optical system 5 at transfer station 9 to paper 11. The image is fixed, typically by heat, at fixing station 13, and the finished printer page is delivered to output tray 15. Printer 1 could instead be, for example, an inkjet photoprinter.

Data processor 17 in printer 1 controls operation of printer 1. Typically, data processor 17 is a microprocessor, often with one or more ASIC combinational logic circuits to speed certain operations. As part of this operation, information received on cable 3 in a high level language is interpreted by data processor 17 to create a bit map of the page to be printed. For example, printer languages typically describe characters of the alphabet in an ASCII code. The form of the character is stored in fonts and these fonts are used to define the final bit map. Other information may be in the form of vectors. Interpretation of such high level languages is now entirely standard and will not be elaborated on further as its use in this invention is straightforward. The 4037 Page Printer sold commercially by the assignee of this invention represents a printer which this invention may employ in its existing form except for the forms on demand and editing elements as described.

Information received on cable 3, as well as other information, is stored in volatile memory 19, a standard DRAM, or non-volatile memory 21, under the control of data processor 17. Memory 21 is preferably flash memory as that provides size and functionality equivalent to the standard volatile memory, such as DRAM, at acceptable cost. A third memory 23 represents standard NVRAM (non-volatile random access memory). NVRAM is expensive and relatively slow, and its use is limited accordingly. It is used primarily to store status and control information, including information defining the mode of the printer 1 in accordance with this invention.

Figure 2:
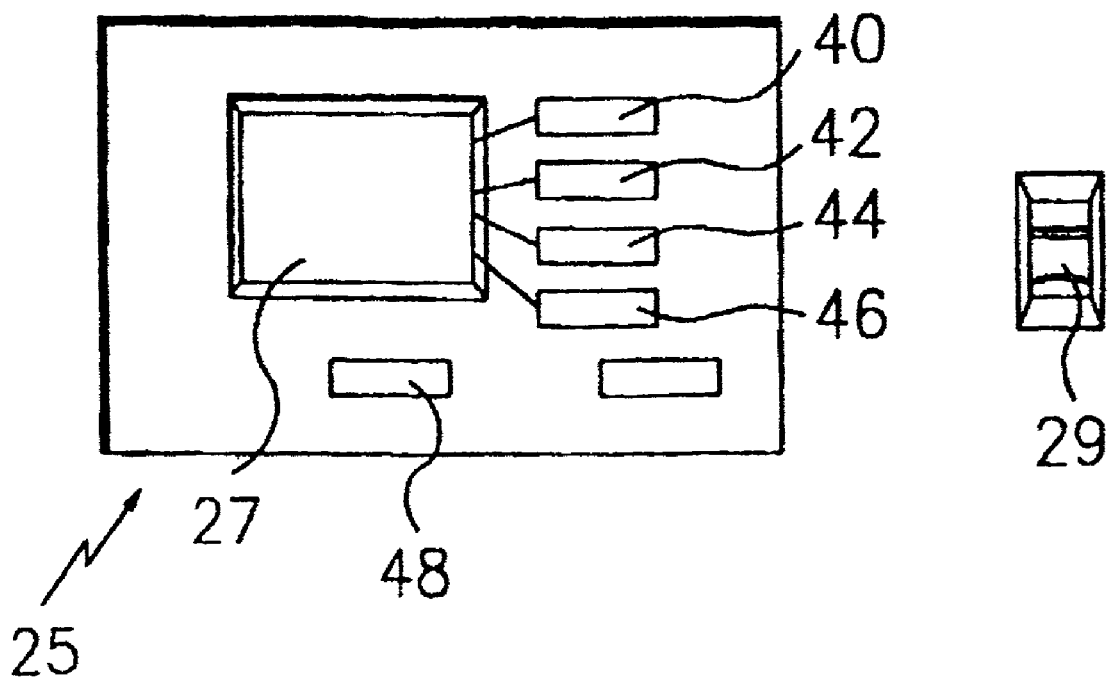
FIG. 2 shows the control panel of the printer with the power switch off.

Printer 1 has a control panel 25 with a middle display 27 and an off-on power switch 29. FIG. 2 shows the display 27 as it appears prior to turn on by switch 29. The display is blank. It has four buttons on the right from the top, 40, 42, 44, and 46. System control by data processor 17 responds to the following to enter the forms on demand mode permitting operator intervention (i.e., not the Retail mode): 1) Key 44, the third key from the top is depressed and held by an operator of printer 1. 2) While key 44 is depressed, switch 29 is turned to the power on position. Once in this mode, the operator may simply press ready key 48 for data processor 17 to return to normal printing mode (other controls, such as a reset entry, are also operative). Absent depressing of key 48 or other override entry, printer 1 is in the forms on demand mode described more fully below.

Another entry to this form mode is from the control panel 25. System control by data processor 17 responds to the following:

1) Printer 1 is turned on by switch 29. (Printer 1 enters normal printing mode when that was the mode at the immediately previous turn off by switch 29. If the power-on default is not normal printing, this entry is not applicable until printer 1 is brought to normal printing mode.)

Figure 3:
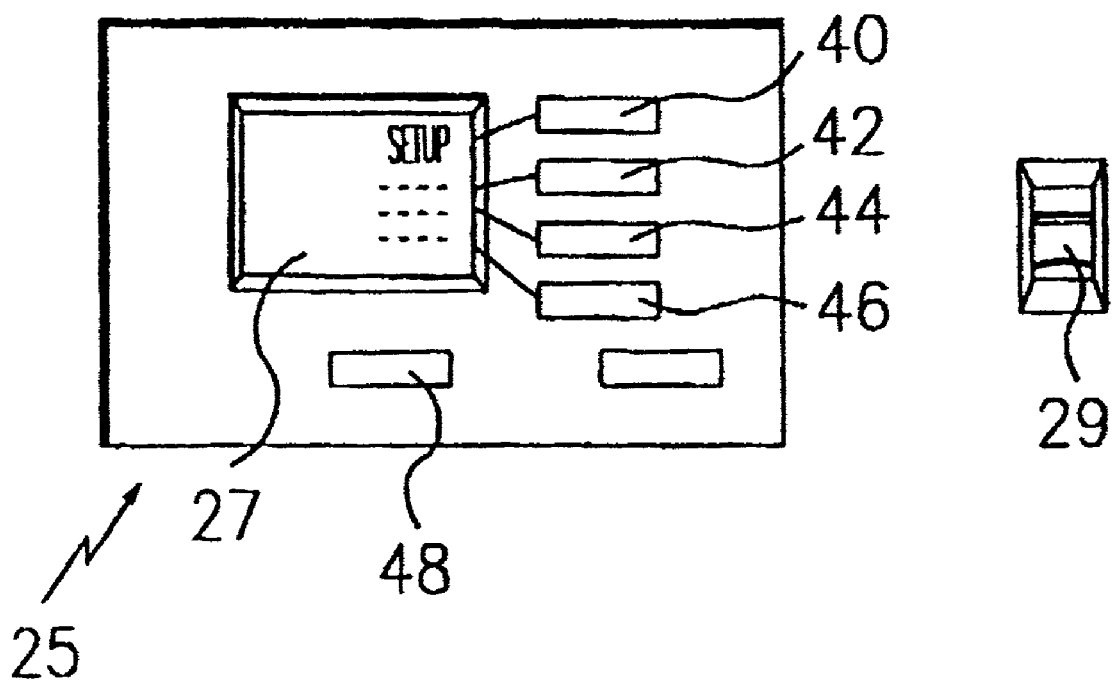
FIG. 3 shows the control panel of the printer with its initial display at turn-on to the normal printing mode.

2) Display 27 then has the term "SETUP" next to key 40 as shown in FIG. 3. Key 40 is depressed.

Figure 4:
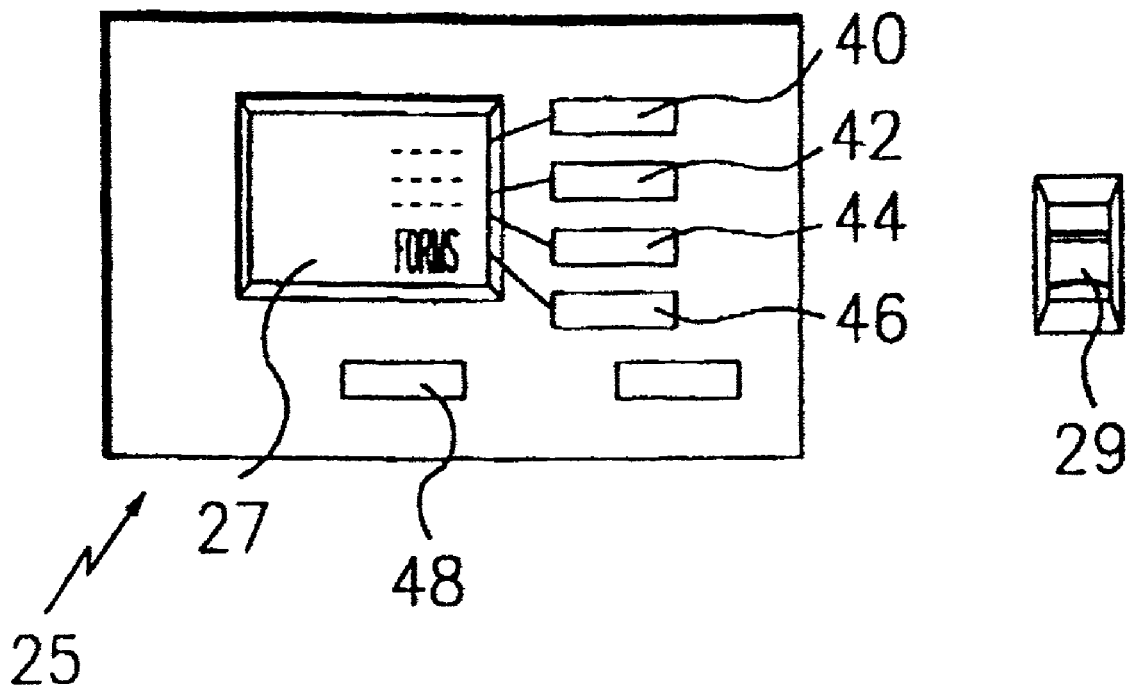
FIG. 4 shows the control panel of the printer with the display reached by the control button opposite the word "Setup" as it appears in FIG. 3.

3) Display 27 then has the term "FORMS" next to key 46, as shown in FIG. 4. Key 46 is depressed. Printer 1 enters the forms mode.

Only when the forms on demand mode is entered by the key 44 at turn-on, NVRAM 23 stores data designating that as the power-on default, to which data processor responds at subsequent turn-on. This is reversed by once again depressing key 44 while turning on switch 29, at which time data in NVRAM is changed to that responded to by data processor 17 to bring printer 1 at turn-on to the normal printing mode.

Figure 5:
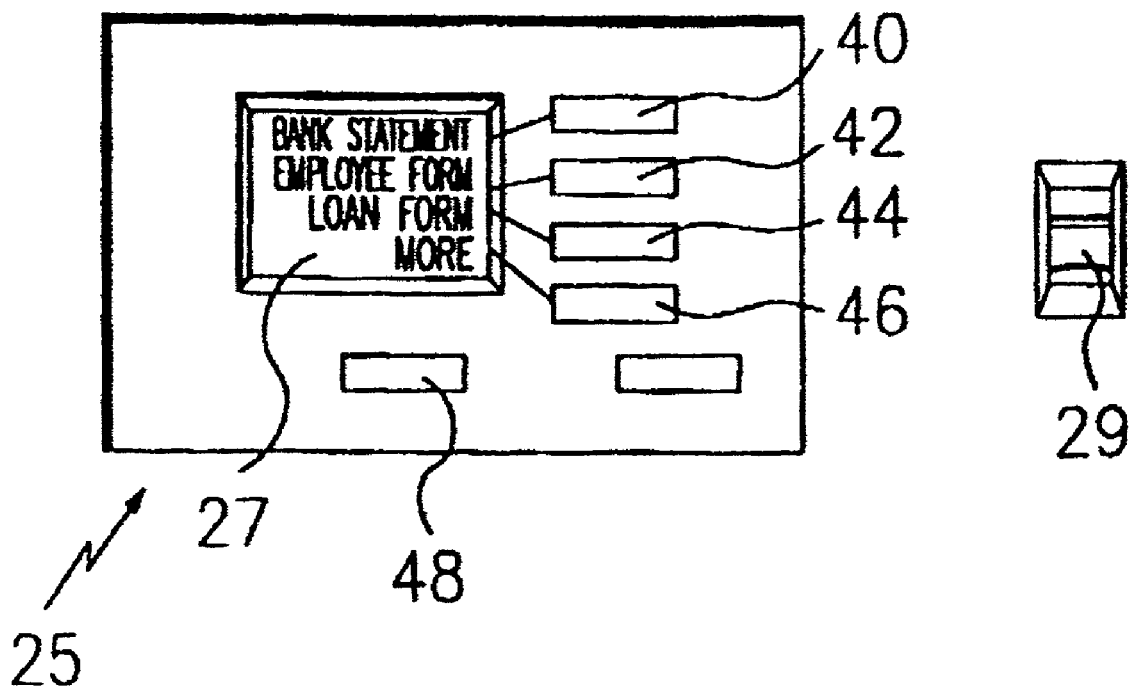
FIG. 5 shows the control panel of the printer with its display when in the forms mode.

FIG. 5 shows the display 27 after entry in the forms mode in which more than four forms are stored as forms in non-volatile memory 21 of printer 1. The names of three forms are displayed next to buttons 40, 42 and 44 respectively. The term "MORE" appears next to button 46, which indicates that further forms will be displayed by pressing of button 44. Upon entry of the forms mode, either by turn-on with switch 29 or from control panel 25 as just described, printer 1 under control of data processor 17 preferably immediately effects normal bit mapping of the form in non-volatile memory 21 to appear first (next to key 40) on display 27. That bit mapped data is stored in DRAM 19. The other forms in the order they appear on display 27 are preferably similarly bit mapped and stored as the available space in memory 19 permits.

To edit and print one of the forms, for example the "EMPLOYEE FORM" indicated in FIG. 5, button 42, the button next to that form, is pressed by the operator. The latest version of the PhotoPrinter from Lexmark is the Kodak PPM200. The PPM200 contains a color LCD and a control panel that allows the user to view images contained in detachable memory (i.e. Compact Flash or Smart Media cards). The PPM200 also has a USB Host port, which allows the user to attach an Iomega Zip Drive to the printer and view the images contained within. Currently the PPM200 allows the user to select text characters using the control panel. Once selected these characters can be overlayed onto the image as a template. The same image viewing technology could be used in the present invention to zoom in on certain areas of the image. The same character selection technology could be used in the present invention to take the user's input and alter the selected portion of the image directly in the bitmap of the image. Once altered this image could be stored for future printing. Note that this would be limited to images in their original format. Images that have already been converted to print data would not be able to be altered using this current technology.

Printer 1 under control of data processor 17 prints the edited form in normal fashion while the word "BUSY" is caused to appear on display 27. In this mode operator intervention to interrupt printing is available to the operator to the same extent as in normal printing.

With the printer of the present invention, one need not always edit stored documents before they are printed; at times a stored document will be printed without editing. In such a case, the printer of the present invention can operate as does the printer of U.S. Pat. No. 5,561,528.

The employee form may not be in readily accessible memory 19 ("cache" being a term for memory which is readily accessible to its associated data processor) because memory 19 could not store it after storing the first form on the list of display 27, bank statement. In this event printing is delayed while data processor 17 prepares the employee form in a bit map as required for printing. In the forms mode one preferred alternative stores the complete new form being printed; in the illustration the employee form is then stored in cache memory 19. This is a recognition that the printing of one copy suggests that the same form is the most probable form to be printed the next time a form is printed. Thus, if the next key after printing employee form is again key 42 to call for a second employee form, printing will begin immediately from the bit mapped data in cache memory 19. A second preferred alternative reformats the first form on the display 27 immediately after printing whichever form is printed. This is a recognition that the operator may wish to know with certainty which form can be immediately printed, as when the printer has multiple operators.

The "Retail" submode of the forms mode is not entered from the control panel 25 in this preferred embodiment. It is only entered by predetermined code entered in non-volatile memory 21. This is by special entry at the host computer. Data processor 17 recognizes that code at turn-on and responds by bringing printer 1 to the Retail mode.

Once in the Retail mode, it can be exited to the normal printing mode by the following:

1) Key 42 is depressed and held.

2) While key 42 is depressed, switch 29 is turned to the power on position Until exit of the Retail mode, at each turn-on data processor 17 brings printer 1 to the Retail mode by reference to default data stored in non-volatile memory 21.

Except that it can only be entered by coding in the non-volatile memory 21, the Retail mode as just described does not differ from that of the prior printer mentioned under the heading "Background of the Invention." In accordance with this invention, the bit map of forms is made immediately on entering the Retail mode and stored in cache memory 19 as described for the forms on demand mode. Additionally, in the Retail mode the content of display 27 may be changed from "Press any key for one page demo", to a list of brochures like the list of forms in the forms on demand mode.

The preparation of forms and brochures may be done by a number of application programs. The forms are typically prepared from a blank condition by an operator creating a wholly or largely unique form using a personal computer. Alternatively, the form may be scanned from a copy. In any event, the form, typically in a high level language as previously mentioned, comes to exist and may be transmitted to printer 1 by signals on cable 3. Such transfer, as will be described immediately following, is conventional and forms no part of this invention. A special software utility for the host computer may be provided to facilitate transfer. Printer 1 under control of data processor 17 responds to the following commands to enter forms into non-volatile memory 21:

1) Switch 29 is turned on and printer 1 is brought to the normal printing status.

2) Conventional driver software suitable to printer 1 basic operation is employed at a host computer applying the signals to cable 3.

3) A unique command for storing files is sent on cable 3.

4) A unique command for opening and naming a file containing a form is sent, the name being that which will appear on display 27.

5) With the form prepared by an application program, the "print to file" entry is made to the application program. The user then instructs the application to print the document in the normal manner. The print to file designation causes the application to create the form on the hard disk on the host computer. Once this operation is complete, the user exits the application and sends the file to the printer.

6) A unique command is sent to close the file.

7) A unique command is sent to designate storage of the form in non-volatile memory 21 as a form. Step 4 has designed the data so stored as a form with the name assigned.

The foregoing procedure is repeated for each form to be stored in non-volatile memory 21. Once the forms are so stored, they may be edited using the printer as mentioned above.

Final printing from the bit map preferably is modified by known techniques to remove stair step appearance of slanted lines, known as enhancement of resolution, by adjustment made based on the final bit map. Alternatives will be apparent and may be devised within the spirit and scope of this invention.

For documents that are too large to be stored on the memory of printer 1, the user has the option of storing only the document's PC memory location on the printer. Thus, when the user chooses to 'speed print' a file for which this option has been chosen, the printer 1 'wakes up' the printer's control program on the PC. The control program then finds and prints the correct file based on the memory location that the printer 1 gives it. When this option is chosen, the printer 1 is no longer a 'stand-alone' device as defined in the invention background section of this disclosure. However, because the printer 1 performs all of the software interaction, the user is still saved from the time required to find and start the correct application, open the correct document, and choose to print. It should also be noted that the user would not be able to edit documents for which this option has been chosen.

Parts List:

The following is a list of parts and materials suitable for use in the present invention:

| PARTS | DESCRIPTION |
|---|---|
| 1 | printer of the preferred embodiment of the present invention (such as a Kodak model PPM 200, PPM 120, or PM 100 printer to which are added the additional memory and editing capability mentioned herein) |
| 3 | communications cable |
| 5 | optical system |
| 7 | drum |
| 9 | transfer station |
| 11 | paper |
| 13 | fixing station |
| 15 | output tray |
| 17 | data processor (such as a microprocessor, often with one or more ASIC combinational logic circuits to speed certain operations) |
| 19 | volatile memory 19, a standard DRAM, or |
| 21 | non-volatile memory (such as flash memory) |
| 23 | third memory (standard NVRAM—non-volatile random access memory) |
| 25 | control panel |
| 27 | middle display of control panel 25 |
| 29 | off-on power switch of control panel 25 |
| 40 | key or button |
| 42 | key or button |
| 44 | key or button |
| 46 | key or button |
| 48 | ready key |

As used herein, "stand-alone printer" means a printer which include means for connection to a standard, commercially available personal computer such as a Compaq Presario, a Dell Dimension 4100, an IBM Aptiva, a Mac computer, or similar laptops.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A printer comprising:

(a) imaging means to print an image of data from a bit map of the image;

(b) non-volatile electronic memory to store information regarding documents to be printed;

(c) transfer means for electronically transferring documents from a personal computer to the printer to be printed, wherein documents are stored on the personal computer, and further comprising computer control means on the printer for causing the printer to retrieve documents from the personal computer and print the documents which are retrieved;

(d) electronic data processing means to control printing of the documents, the electronic data processing means having a selectable first mode to print documents from data received from a personal computer after selection of the first mode, and having a selectable second mode to print documents stored on the personal computer using information stored in the non-volatile electronic memory;

(e) mode selection means to select the first mode and the second mode; and (f) manual document selection means on the printer operative in the second mode to permit selection of documents stored on the personal computer to be printed by the printer using information stored in the non-volatile electronic memory.

2. The printer of claim 1, comprising an ink jet printer.

3. The printer of claim 1, wherein the document selection means comprises an LCD and control console on the printer.

4. The printer of claim 1, wherein documents on the personal computer have a memory location on the personal computer, and the non-volatile electronic memory stores the memory location regarding documents to be printed.

5. The printer of claim 4, wherein the personal computer has a printer control program, and in the second mode the printer 'wakes up' the printer control program on the personal computer, and the control program then finds and prints the correct document based on the memory location that the printer gives it.

* * * * *